Sept. 17, 1946.   W. S. HUTCHINSON ET AL   2,407,882
GENERATOR
Filed May 27, 1944
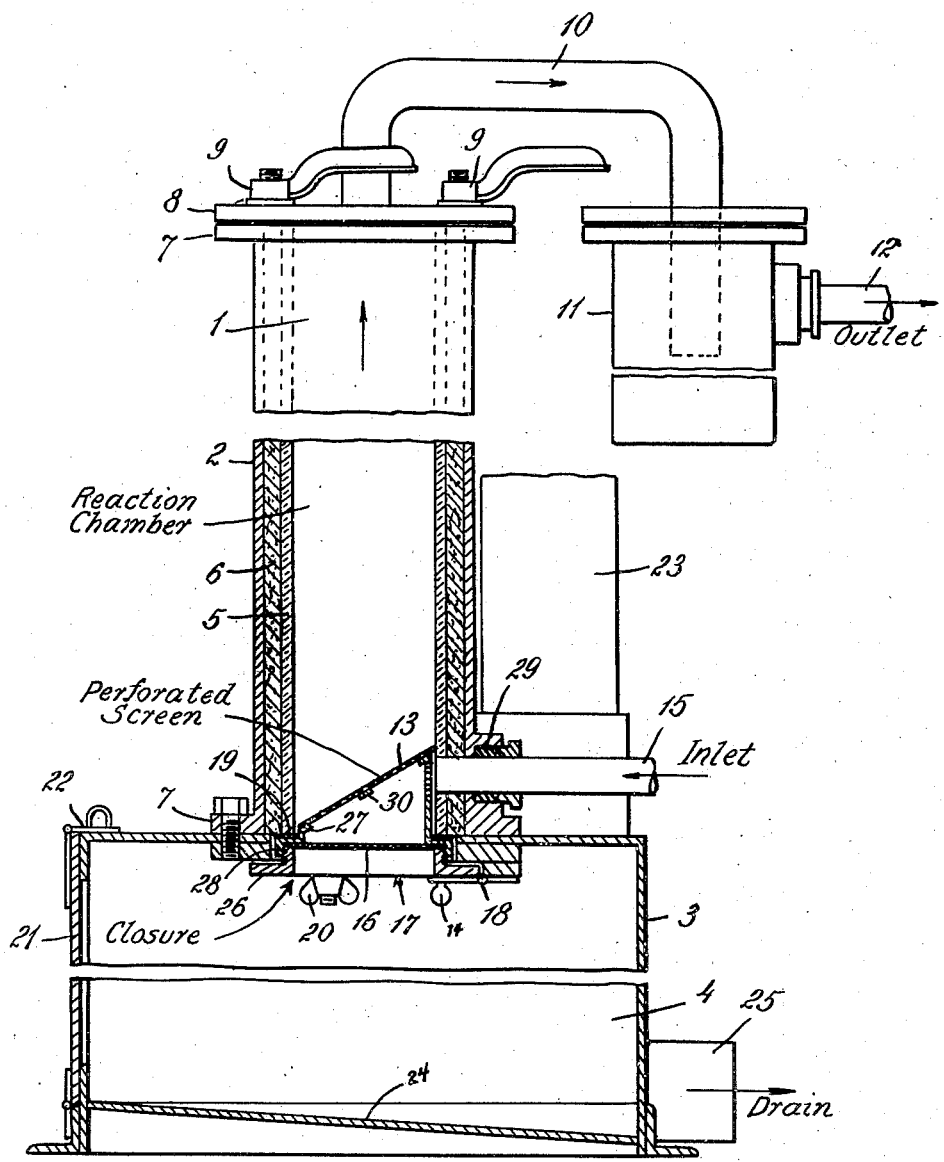
INVENTORS
WILLIS S. HUTCHINSON and
ERIC R. WOODWARD
BY
Pennie, Davis, Marvin & Edmonds
ATTORNEYS Patented Sept. 17, 1946

2,407,882

UNITED STATES PATENT OFFICE 2,407,882

GENERATOR

Willis S. Hutchinson, St. Paul, Minn., and Eric R. Woodward, New York, N. Y., assignors to The Mathieson Alkali Works, Inc., New York, N. Y., a corporation of Virginia Application May 27, 1944, Serial No. 537,752

5 Claims. (Cl. 23—281)

This invention relates generally to gas generators and more particularly to an improved gas generator especially adapted for use in the generation of explosive gases. It is, however, also applicable to the generation of non-explosive gases.

The invention provides means whereby the probability of disastrous results of an explosion within the generator is avoided or substantially minimized.

Our improved gas generator is particularly applicable to the generation of chlorine dioxide by the reaction of chlorine gas with a chlorite and will be described herein with particular reference to such operation. It will be understood, however, that the utility of the invention is not limited to such use but that the invention in its broader aspect is generally applicable to the generation of gases by the reaction of a gas or gaseous mixture with solids or liquids, especially with solids of relatively small particle size.

In the United States Patent No. 2,309,457 there is described an improved process for generating chlorine dioxide which comprises passing chlorine gas, in admixture with air or other diluent gas, in contact with a solid chlorite, for instance sodium chlorite or calcium chlorite. By the careful control of the chlorine-air mixture passed to the reaction zone, effluent gases of safe chlorine dioxide concentrations may be obtained.

A difficulty experienced in the generation and handling of chlorine dioxide has been the explosion hazard. It is generally necessary, in order to avoid explosion hazards, to generate and handle chlorine dioxide in a rather high state of dilution with air or some other inert gaseous medium. For instance, the handling of chlorine dioxide in concentrations such that the partial pressure of the chlorine dioxide is equal to about 70 millimeters of mercury or higher is usually unsafe. Should the concentration be permitted to equal or exceed this amount, explosion is likely to occur.

Should the concentration of chlorine dioxide generated in the reaction zone in an operation of this type reach that at which an explosion results, the heat of reaction is so great that the chlorite is rapidly converted to chlorate at a temperature which is apt to be above the melting point of the chlorate, i. e., 248° C. As this hot chlorate is an active oxidizing agent, it will set fire to any organic matter with which it may come in contact. It is therefore important, in the case of explosion, that this hot fused chlorate be confined.

In our improved generator, this hazard is guarded against by providing, contiguous to the reaction chamber, an enlarged discharge chamber partitioned from the reaction chamber by a relatively thin disc of metal, for instance silver, or a plastic material, of sufficient strength to withstand normal operating pressures but which, should an explosion occur, will be ruptured and permit the contents of the reaction zone, including chlorine and chlorine dioxide gases, to discharge into the discharge chamber.

The port leading from the reaction chamber to the discharge chamber, sealed by said disc, is with advantage of such cross-sectional area that, upon rupture of the disc, free and substantially unrestricted communication with the discharge chamber is established, so as to minimize back pressures in the reaction chamber.

The discharge chamber is with advantage provided with a gas vent, also of relatively large cross-sectional area, leading off to the atmosphere for the safe discharge of gases from the discharge chamber. Advantageously, the discharge chamber is also provided with a drain through which the discharged salts may be flushed with water to a suitable place of disposal.

Likewise, in the event of explosion, there is danger of salts within the reaction chamber being blown through the effluent gas line into the distribution system. In order to avoid the blowing of these salts out through the distribution lines, the effluent gas line may lead from the reaction chamber to an enlarged expansion chamber wherein any solid particles entrained by the effluent gases are separated therefrom by reason of the decreased velocity of the gases.

Our invention will be more fully described and specifically illustrated by reference to the accompanying drawing which represents a vertical cross-sectional view of an especially advantageous embodiment of our invention adapted to the generation of chlorine dioxide by reacting chlorine with a solid chlorite.

In the drawing, a reaction chamber 1, formed by a vertically elongated cylinder 2, is shown mounted on and extending upwardly from a rectangular base 3 which forms a discharge chamber 4. The cylinder 2 and rectangular base 3, may, for instance, be constructed of iron or steel. However, where the apparatus is to be used with corrosive gases, such as chlorine and chlorine dioxide, the parts exposed to the corrosive gases should be constructed of corrosion-resistant materials, for instance glass, stoneware or corrosion-resistant plastics or metals.

In the drawing, the cylinder 2 is provided with an inner lining of glass or stoneware 5 which is sealed into the cylinder 2 by a layer of adhesive material 6.

The dimensions and proportions of the reaction chamber may be varied, depending upon the capacity desired. For the generation of chlorine dioxide, generally satisfactory results have been obtained using a reaction chamber of about four inches in diameter and about three and one-half feet in height. The construction of the chamber for the generation of chlorine dioxide, for instance, by the previously noted reaction should be such as to withstand a superatmospheric operating pressure of at least about two to five pounds per square inch, with the usual factor of safety.

The cylinder 2 is with advantage flanged at each end as shown at 7, the lower flange being adapted to be bolted to the rectangular base 3 and the upper flange bolted to a removable cover plate 8 by means of locknuts 9. The effluent gas line 10 leads from a centrally-positioned port in cover plate 8 to the expansion chamber 11 and extends downwardly into the chamber to a point beneath the gas outlet 12 leading from the chamber to the distribution system.

At its lower end the reaction chamber 1 is provided with a perforated support 13, such as a grid, screen or the like, adapted to support a finely-divided granular or flaked solid, chlorite for instance, and an inlet 15 for introducing a mixture of chlorine and air into the chamber beneath the support. The lower end of the chamber 1 is hermetically sealed and partitioned from discharge chamber 4 by the disc 16, supported by the closure member 17.

The closure member 17 shown in the drawing is so constructed as to form a support both for screen 13 and disc 16 and is removably fastened as by nut 14 to a hinged member 18 and adapted to form a gas-tight seal for the lower end of the reaction chamber. Also, it is so proportioned that the entire closure member may be swung downwardly to discharge residual salts from the reaction chamber into the discharge chamber 4 when, in normal operation, the chlorite charge has become exhausted. In operation, the hinged closure member 17 is held tightly against the gasket 19, as by wing nuts 20.

The discharge chamber 4 is provided with a hinged cleanout door 21 normally held closed by a fastener 22 of any conventional type. A vent pipe 23 leads from the upper part of chamber 4 to the atmosphere, to carry off any gases which may pass into the chamber 4, due to rupture of disc 16 or during discharge of residual salts from chamber 1. Vent 23 should be of sufficient cross-sectional area to exhaust such gases without creating substantial back pressure in the discharge chamber. The size of the vent will, of course, depend upon the capacity of the generator.

The floor 24 of chamber 4 is with advantage sloped as shown in the drawing so as to facilitate removal of the discharged salts by flushing with water into the drain line 25.

Since the discharge chamber and the vent are not normally in contact with corrosive materials, they may be constructed of iron or steel, though less corrosive materials are, of course, desirable.

The closure member 17 shown in the drawing is constructed of a flanged externally-threaded fitting 26 adapted to engage the internally-threaded screen-supporting member 27 at 28.

The closure disc 16 is supported by and firmly held between these two members and may be readily replaced by swinging the closure 17 downwardly and unscrewing therefrom screen-supporting member 27.

The inlet line 15 is sealed into the cylinder 2 by means of the packing gland 29. That portion of the screen-supporting member 27 adjacent to the inlet line 15 is so perforated as to permit the passage of the chlorine-air mixture through the perforations into the space beneath the screen. Additional support for the screen 13 may be supplied by cross-members such as shown at 30.

The supporting screen 13 is shown in the drawing as inclined from the horizontal. Though the inclination of the supporting screen is not essential to our invention in its broader aspect, the arrangement shown has distinct advantages. A primary advantage of the arrangement shown is that sufficient clearance is thereby provided to permit the swinging of the composite member 17 downwardly when it is desired to discharge residual salts from the reaction chamber and yet adequate space is provided for the introduction of the gas mixture beneath the supporting screen, and with less reduction in chlorite capacity of the reaction chamber.

In operation, the reaction chamber 1 may be almost completely filled with flaked chlorite through an opening in the cover plate 8, not shown in the drawing, or by removal of the cover plate 8. After charging, the chamber is closed and the chlorine or chlorine mixture is charged into the zone beneath the supporting screen through inlet 15 and passes up through the reaction chamber 1 in contact with the chlorite. The chlorine of the chlorine-air mixture reacts with the chlorite to form chlorine dioxide and the latter is diluted, as formed, as by the air charged to the reaction chamber with the chlorine.

In normal operation, there is little or no entrainment of the chlorite in the chlorine dioxide-gas mixture passing from the chamber through line 10. However, in case of explosion or abnormal operation, salts may be entrained in the effluent gases but, by reason of the decreased velocity of the gases in the enlarged expansion chamber 11, any entrained salts are settled out and passage thereof into the distribution system is prevented. Also, in case of explosion within the reaction chamber, the disc 16 is ruptured by reason of the increased pressure and the molten salt discharged into the chamber 4, and thus confined in an area where it can cause no damage. Gases discharged into chamber 4 pass off therefrom through the vent 23 to the atmosphere or other suitable place of disposal.

The thickness of the disc 16 will, of course, depend upon the area of the disc to be exposed to the reaction chamber pressure and also upon the material of which it is fabricated and the permissible pressures within the reaction chamber. It is desirable that the cross-sectional area of the disc be substantially co-extensive with the cross-sectional area of the reaction chamber. In the apparatus specifically described, for the generation of chlorine dioxide, we have with advantage used a silver disc of approximately four inches in diameter and .0025 inch in thickness. Discs suitable for use in apparatus of different sizes and under different conditions may readily be determined from the normal and permissible pressures within the reaction chamber.

In the apparatus specifically described, the discharge chamber is centrally positioned below the reaction chamber. Though this arrangement has distinct advantages, the reaction chamber may be otherwise placed, for instance to the side of or below the reaction chamber, without departing from the scope of our present invention.

Where the reaction chamber is to be charged with a reactant in the liquid form, the perforated support 13 may be omitted and a suitable head connected to the gas-inlet 15 used for dispersing the incoming gas uniformly through the liquid. Also, a pipe connection may be provided at the lower end of chamber 1 for draining and recharging the reaction chamber.

We claim:

1. A gas generator comprising a reaction chamber, a vented discharge chamber below the reaction chamber, and a gas-impervious disc intermediate the chambers sufficiently strong to withstand a predetermined operating pressure in the reaction chamber but rupturable at pressures exceeding such predetermined pressure to provide a passage-way between the chambers.

2. A gas generator comprising a reaction chamber, inlet means associated with the lower portion of the reaction chamber, outlet means associated with the upper portion of the reaction chamber, a vented discharge chamber centrally positioned below the reaction chamber, and a gas-impervious disc intermediate the chambers sufficiently strong to withstand a predetermined operating pressure in the reaction chamber but rupturable at pressures exceeding such predetermined pressure to provide a passage-way between the chambers.

3. A gas generator comprising a vertically disposed reaction chamber, a perforated support spaced from the lower end of the reaction chamber, inlet means associated with the lower portion of the reaction chamber below said support, outlet means associated with the upper portion of the reaction chamber, a vented discharge chamber centrally positioned below the reaction chamber, and a gas-impervious disc intermediate the chambers sufficiently strong to withstand a predetermined operating pressure in the reaction chamber but rupturable at pressures exceeding such predetermined pressure to provide a passage-way between the chambers.

4. A gas generator as claimed in claim 3 in which the passage-way between the reaction chamber and the discharge chamber, normally closed by the rupturable disc, is of substantially the same horizontal cross-sectional area as the reaction chamber.

5. A gas generator comprising a vertically disposed reaction chamber, a perforated support spaced from the lower end of the reaction chamber, an inlet line associated with the lower portion of the reaction chamber below said support, an outlet line associated with the upper portion of the reaction chamber, an expansion chamber in the outlet line, a vented discharge chamber centrally positioned below the reaction chamber and a gas-impervious disc intermediate the reaction chamber and the discharge chamber sufficiently strong to withstand a predetermined operating pressure in the reaction chamber but rupturable at pressures exceeding such predetermined pressure to provide a passage-way between the reaction and discharge chambers.

WILLIS S. HUTCHINSON.
ERIC R. WOODWARD.